Oct. 6, 1970     M. SKOBEL ET AL     3,531,829
APPARATUS FOR MANUFACTURING SHEATHED FLEXIBLE SEALING MEMBERS
Filed Oct. 21, 1968     2 Sheets-Sheet 1

INVENTORS
MAX SKOBEL
A. C. HETHERINGTON

BY *Howard W. Heumann*

ATTORNEY

Oct. 6, 1970     M. SKOBEL ET AL     3,531,829
APPARATUS FOR MANUFACTURING SHEATHED FLEXIBLE SEALING MEMBERS
Filed Oct. 21, 1968     2 Sheets-Sheet 2

INVENTORS
MAX SKOBEL
A. C. HETHERINGTON

BY *Howard W. Hermann*
ATTORNEY

United States Patent Office 3,531,829
Patented Oct. 6, 1970

1

3,531,829
APPARATUS FOR MANUFACTURING SHEATHED
FLEXIBLE SEALING MEMBERS
Max Skobel, Edison, and Alexander C. Hetherington,
Westfield, N.J., assignors to Dow Corning Corporation,
Midland, Mich., a corporation of Michigan
Filed Oct. 21, 1968, Ser. No. 769,056
Int. Cl. B29f 3/00
U.S. Cl. 18—13                                              6 Claims

ABSTRACT OF THE DISCLOSURE

There is disclosed herein apparatus for forming elongated members of flexible material substantially enclosed in a sheath, the apparatus including a forming die for forming an incoming web of sheathing material into a generally U-shape, a mandrel extending axially of the U-shaped configuration, and an inclined planar forming surface for closing the U-shaped configuration around the mandrel. The flexible material in a flowable state is extruded from the mandrel into the pre-shaped sheath.

BACKGROUND OF THE INVENTION

The present invention relates to the manufacture of elongated sealing members and more particularly relates to apparatus for the continuous manufacture of sealing members and the like which comprises a polymeric material substantially enclosed in a sheath.

Elongated sealing members have many applications. Articles of this type are used, for example, as weather stripping around doors, seals for refrigerators and oven doors, and the like, and as waterproof gasketing material. While such sealing members are sometimes formed of resilient or compressible polymeric materials alone, it is often desirable to provide a covering such as fabric over the polymeric material to protect the material from damage due to exposure air, light, heat and other aspects of their environment which could cause deterioration. Additionally, fabrics or other sheathing materials are provided in some cases to provided added strength, prevent sticking or even to provide a more attractive appearance.

Heretofore, fabric-covered sealing strips have been formed by molding processes. Such processes entail lining a mold with the desired fabric and then filling the mold with the desired polymeric material. Alternatively, the polymeric material is molded by itself, and a fabric backing is then wrapped over the molded material and adhered to it to complete the product.

These steps suffer from several disadvantages. The processes are, first of all, time consuming in that a great deal of labor is involved in setting up molds, removing products from molds and, in the latter process, wrapping the molded polymer. Additionally, the forming of molds is an expensive operation. Since the strips to be formed are generally of an extensive length compared to the width dimensions, the mold, to be practical, must be extremely long. Even though long molds are used, the material ejected from the mold is still of necessity in relatively short lengths and therefore cannot be handily coiled or rolled onto drums or other convenient storage mediums.

2

SUMMARY OF THE INVENTION

By the present invention there is provided apparatus for continuously forming infinitely long lengths of sealing members of flexible material substantially enclosed by a sheath. The primary object of the present invention is to provide apparatus for continously producing such elongated sheathed sealing members while eliminating, insofar as possible, the aforementioned problems which were inherent in the above-mentioned prior art.

Briefly, this and other object are accomplished by providing a supply of sheathing material in web form and feeding the web into a forming die. The forming die has an entrance portion comprising a slot of generally U-shaped configuration, the slot being adapted to pre-shape the incoming web. A mandrel feed portion extends into the forming die and feeds a mandrel, which extends axially of the U-shaped web configuration, in a direction away from the entrance portion of the die. A pair of shaping surfaces substantially close the web around the mandrel and into the final desired sheath configuration, whereupon the flexible material in liquid form is extruded from the mandrel to fill the area enclosed by the web leaving a hollow portion in the center, if desired. The completed uncured sealing member is then fed through curing apparatus and may be wound on a reel or coil to facilitate handling.

The elongated members can thus be formed continuously and made in infinite lengths as desired. Since the required die can be very short in length compared to the lengths of the molds required in prior art devices, the cost of equipment is minimized. Additionally, no labor is involved in removing the formed product from the apparatus as was heretofore required. There is further no need for the multiplicity of molds of various lengths that were required in prior art devices for making such seals. The long length of the material can simply be cut into portions of the lengths desired for any particular application. Thus, the system is economical in both time and equipment, as well as providing a more convenient product than was heretofore known.

DESCRIPTION OF THE DRAWINGS

Other objects of the present invention will become obvious to those skilled in the art from a consideration of the following detailed description when read in conjunction with the accompanying drawings wherein.

DESCRIPTION OF THE PREFERRED EMBODIMENTS

Figure 1:
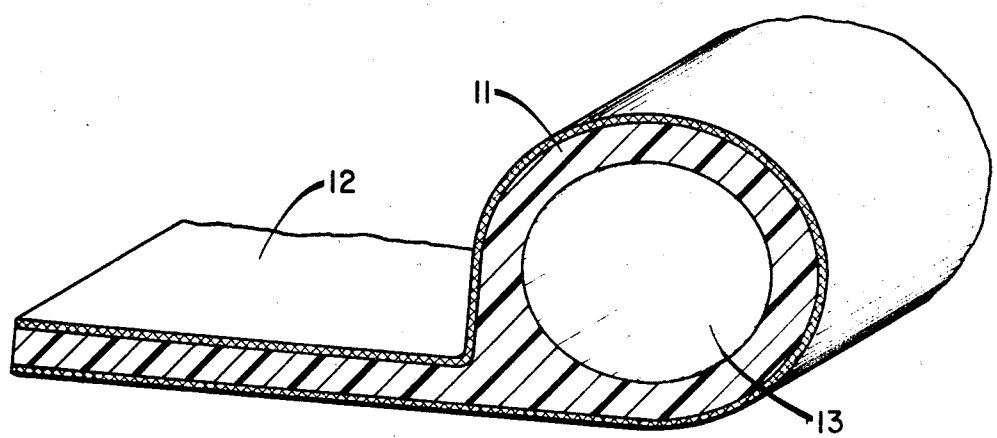
FIG. 1 is a view in perspective of a portion of a sealing member made in accordance with the present invention.

Referring now to the drawings wherein like reference numerals designate like or corresponding parts throughout the figures thereof, there is shown in FIG. 1 a portion of an elongated, generally tadpole-shaped strip suitable for use, for example, as a door seal. The strip comprises a body 11 of polymeric material which is preferably elastomeric in nature covered by a sheath 12 which extends substantially over the entire periphery of the polymeric body. The flexible polymeric body 11 is shown with a hollow 13 in the center portion of the enlarged side thereof to provide greater resilience, but it should be understood that the flexible body 11 can be solid, if so desired.

Various configurations of elongated strips of the type shown in FIG. 1 are presently known in the art. As previously indicated, the polymeric material is preferably an elastomer. Both natural and synthetic rubbers, such as silicone rubbers, Neoprene and polyesters, for example, are suited for this purpose. The sheathing member 12 is chosen for the desired surface characteristics depending upon the use which the strip is to be put into polymeric materials which the sheath encompasses. In most applications, the sheath would be a fabric material such as polyesters, glass fibers, or natural fibers such as cotton. It is to be understood, however, that the specific materials form no part of the present invention and that the examples given are merely for purposes of illustration.

Figure 2:
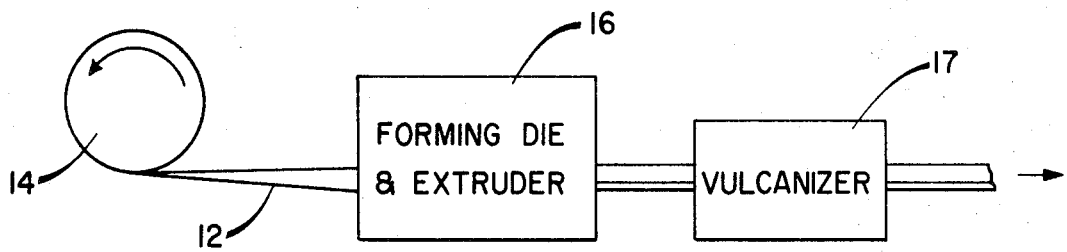
FIG. 2 is a diagrammatic view of a system for accomplishing the manufacture of the sealing member of FIG. 1.

FIG. 2 illustrates diagrammatically the system of the present invention for producing elongated members of the type shown in FIG. 1. An elongated web 12 is fed from a supply reel 14 into a forming die and extruder 16, the extruder, of course, being supplied with a suitable flowable polymeric stock. In the forming die and extruder the web 12 is formed to the desired external configuration such as that shown in FIG. 1, and the flowable polymeric material is extruded therein. Generally, the polymeric material requires vulcanization to effect a cure and make the sealing member ready for use. The elongated member is therefore fed from the forming die and extruder 16 into a vulcanizer 17 where curing takes place. From the vulcanizer the member can be either wound on reels, coiled or cut into lengths as desired.

Figure 3:
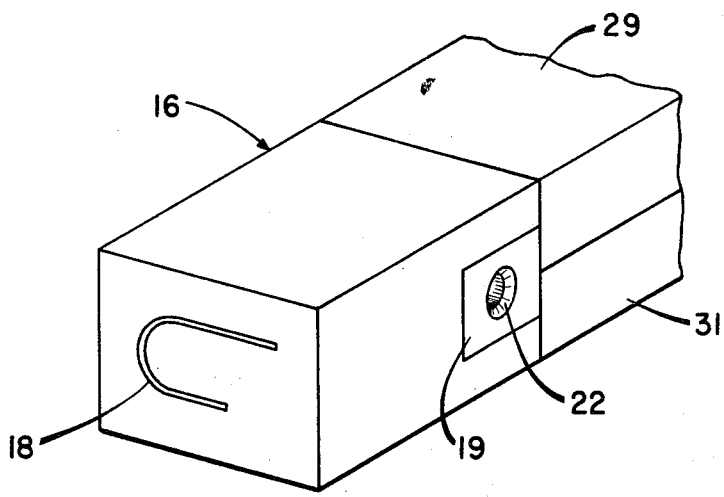
FIG. 3 is a view in perspective of the entrance portion of the forming die shown schematically in FIG. 2.

FIG. 3 illustrates the entrance portion of the forming die and extruder 16. The web of sheathing material enters the die through a slot 18 having a generally U-shaped configuration. The die and extruder are conveniently formed with a mandrel feed portion 19 exposed at the surface thereof in the direction toward the open end of the U-shaped configuration. The mandrel and mandrel feed portions can be seen more clearly from FIGS. 4 and 5. The external surface 21 of the mandrel feed portion conforms to the inner surface of the U-shaped configuration of the entrance portion of the die. The mandrel feed portion 19 is, of course, adapted to be connected to a source of polymeric material under pressure as is conventional in extruding material and for this purpose has a hole 22 tapped therein and drilled to feed the mandrel 23. The mandrel 23 as shown extends substantially at right angles to the hole 22 and axially of the U-shaped configuration of the entrance portion in a direction away from the entrance portion.

Figure 4:
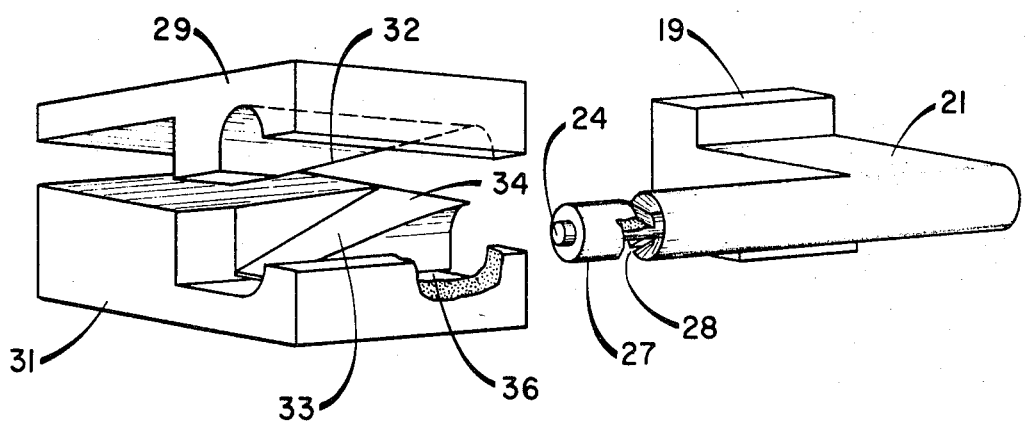
FIG. 4 is an exploded view in perspective of the mandrel feed portion, mandrel and final forming die portions of the forming die shown in part in FIG. 3.
Figure 5:
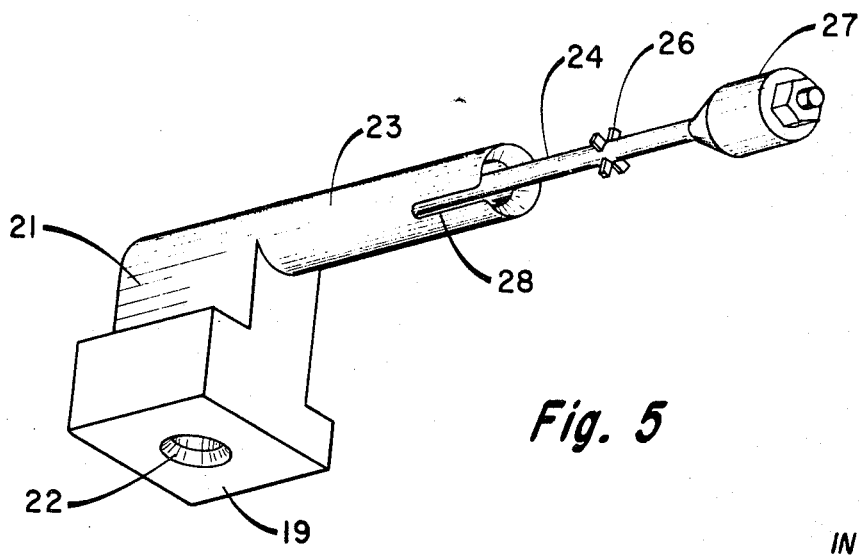
FIG. 5 is another view in perspective of the mandrel and mandrel feed portions of FIG. 4 with the mandrel partly pulled from the feed portion to illustrate the details thereof.

In order to form a hollow extrusion, the mandrel is provided with a concentric rod 24 having a centering spider 26 thereon and having an enlarged forming portion 27 threadedly affixed to the end thereof. The hollow-forming portion 27 can be adjustably spaced from the end of the tubular portion 23 to provide for differences in viscosity for material being ejected and differences in pressure in any given application. As shown in FIG. 5 the rod 24 has been pulled from the tube 23 in order to show the details of the mandrel. It will be realized that in use the tape portion 27 will be positioned adjacent the tubular portion 23 as shown in FIG. 4. The space between the hollow-forming portion 27 and tubular portion 23 forms a circumferential extrusion orifice, and additionally, a longitudinal slot 28 is provided in the tubular portion 23 to provide for extrusion in the direction of the tail of the tadpole-shaped configuration of FIG. 1.

The forming die 16 has a pair of portions 29, 31 positioned adjacent the mandrel. These die portions are designed to transpose the web of sheathing material in the legs of the U-shaped configuration to the desired substantially closed shape such as that shown in FIG. 1. The tube portion 23 of the mandrel acts as a shaping die for the rounded surface of the incoming sheath material.

As can be seen from FIG. 4, the blocks 29 and 31 provide a pair of inclined planes 32 and 33 positioned in parallel spaced relationship to guide the longer leg of the U-shaped web in a path convergent with the shorter leg. The end 34 of each of the inclined planes 32 and 33 is wider than the opposite end of the two planes, since the width of the web which remains in the plane becomes progressively less as the web leg travels downwardly, wrapping around the tubular surface 23 of the mandrel. The block 31 is provided with a second slot 36 which is in planar alignment with the shorter leg of the web shaping slot 18 of the entrance portion and provides a surface to guide this leg along a straight course. The length of the tubular portion 23 of the mandrel is slightly longer than the axial length of the inclined plane so that extrusion takes place after the web of sheathing material has been completely formed. This eliminates any problem when pressure drops or increases in the extruded material due to change in cross-sectional area encompassed by the feeding web along the path of travel.

While the preferred embodiments of the forming die and extruder have been illustrated in the drawings, it should be realized that variations and modifications of these parts are possible in the light of the above teachings. It is to be understood, therefore, that within the scope of the appended claims, the invention may be practiced otherwise than as specifically described.

That which is claimed is:

1. An apparatus for forming elongated members of flexible material substantially enclosed in a sheath comprising:
   a forming die having an entrance portion comprising a slot having a generally U-shaped configuration, said slot being adapted to pre-shape an incoming continuous web of sheathing material,
   a mandrel feed portion adjacent said entrance portion and extending into the open end of said U-shaped configuration,
   a hollow mandrel connected to said mandrel feed portion and extending axially of said U-shaped configuration in a direction away from said entrance portion,
   a pair of spaced, juxtaposed shaping surfaces extending adjacent said mandrel and formed to transpose the web of sheathing material in the legs of said U-shaped configuration to the desired substantially closed shape, thereby allowing said flexible material in a liquid state to be extruded from said mandrel into the shaped sheathing material.

2. An apparatus as defined in claim 1 wherein said shaping surfaces comprise an inclined plane arranged to fold one leg of the U-shaped web into close proximity with the other leg of the web.

3. An apparatus as defined in claim 2 wherein the mandrel has both a circumferential extrusion orifice and a longitudinal slot opening substantially in a direction between said legs whereby the extruded material is forced between the legs of the sheathing material.

4. An apparatus as defined in claim 2 wherein a second inclined plane is positioned in parallel, spaced relationship to said first mentioned inclined plane forming a groove through which the web travels.

5. An apparatus as defined in claim 4 wherein the width of said inclined plane is progressively narrower in the direction of web travel to compensate for the web material being bent around said mandrel.

6. An apparatus as defined in claim 1 wherein said shaping surfaces comprise a pair of slots, one in planar alignment with one leg of the entrance portion of said forming die, and the other at an angle sufficient to cause the other leg of the web of sheathing material to travel in a path convergent with said one leg to a point in close proximity therewith.

References Cited

UNITED STATES PATENTS 1,716,505   6/1929   Robinson.
2,612,656   10/1952  Lyon.
3,118,800   1/1964   Snelling.

ANDREW R. JUHASZ, Primary Examiner

L. GILDEN, Assistant Examiner

U.S. Cl. X.R.

18—12